(12) United States Patent
Huang (10) Patent No.: US 6,666,304 B1
(45) Date of Patent: Dec. 23, 2003

(54) LINING ADJUSTABLE DEVICE FOR DISK BRAKE SYSTEM

(76) Inventor: Tan-Cheng Huang, 6 Fl., No. 2-1, Swei St., Taichung (TW)

( * ) Notice: Subject to any disclaimer, the term of this patent is extended or adjusted under 35 U.S.C. 154(b) by 0 days.

(21) Appl. No.: 10/323,288

(22) Filed: Dec. 19, 2002

(51) Int. Cl.[7] .................... F16D 55/02; B62L 5/00; B62L 3/00
(52) U.S. Cl. .................... 188/24.19; 188/71.8; 188/26
(58) Field of Search ................ 188/24.19, 71.8, 188/26, 24.11, 196 R, 204 R, 196 P, 24.12, 71.7, 73.45, 71.1, 73.31; 192/111 A (56) References Cited

U.S. PATENT DOCUMENTS

| | | | | |
|---|---|---|---|---|
| 5,979,609 A | * | 11/1999 | Tsai | 188/26 |
| 6,230,850 B1 | * | 5/2001 | Huang | 188/24.21 |
| 6,334,513 B1 | * | 1/2002 | Chern | 188/71.7 |
| 6,340,074 B1 | * | 1/2002 | Lumpkin et al. | 188/26 |
| 2003/0019965 A1 | * | 1/2003 | Lai et al. | 188/71.8 |

* cited by examiner

*Primary Examiner*—Douglas C. Butler
(74) *Attorney, Agent, or Firm*—Charles E. Baxley (57) ABSTRACT

A bicycle disk brake system includes two linings located on two sides of a brake disk and an arm is fixed to a bicycle frame. Two adjusting rods are fixed to the arm and two mounting pieces made of flexible material are mounted to the two respective shanks of the two adjusting rods. A clamp portion is defined around the hole of each mounting piece and the two shanks are clamped by the clamp portions. Two spring portions extend from each of the mounting pieces and two extensions extend from the two spring portions so as to be fixed to a frame through which the two shanks extend. The frame is shifted by the spring portions and the clamp portion when braking so as to adjust the gaps of the linings and the brake disk.

8 Claims, 10 Drawing Sheets

LINING ADJUSTABLE DEVICE FOR DISK BRAKE SYSTEM

FIELD OF THE INVENTION

The present invention relates to a disk brake system that includes a movable frame movably mounted on two rods and the frame is capable of movement to adjust the gaps between the two linings and the disk.

BACKGROUND OF THE INVENTION

A conventional disk brake system can be operated by two ways, one of which is called stationary type and the other is called floating type. In the first type, a problem is that the two linings do not contact the disk simultaneously so that the lining that contacts the disk first has much more worn than the other. This affects the efficiency of the brake and the disk is worn unevenly. The floating type brake system is capable of moving the frame. Nevertheless, when the brake action is released, the lining still contacts the disk and noise is generated. The friction between the disk and the lining exists after the brake action is released and this reduces the speed of the bicycles. If the bicycle is ridden on a rugged road, the relative positions of the linings and the disk changes and the gaps between the two linings and the disk could be are narrowed. This makes the brake efficiency be lowered.

The present invention intends to provide a brake system that has a movable frame so as to adjust the gaps between the two linings and the disk to obtain a satisfied braking action.

SUMMARY OF THE INVENTION

In accordance with one aspect of the present invention, there is provided a disk brake system which comprises two linings located on two sides of a brake disk and an arm is fixed to a bicycle frame and includes a top portion and a lower portion.

A first adjusting rod has a first threading end fixed to the top portion, and a first shank which extends through a frame. A second adjusting rod has a second threading end fixed to the lower portion, and a second shank extends through the frame.

A mounting device includes at least one mounting piece made of flexible material and has a hole so that the first shank or the second shank extends through the hole and is clamped by a clamp portion around the hole. Two spring portions extend from the at least one mounting piece and two extensions extend from the two spring portions so as to be fixed to the frame.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
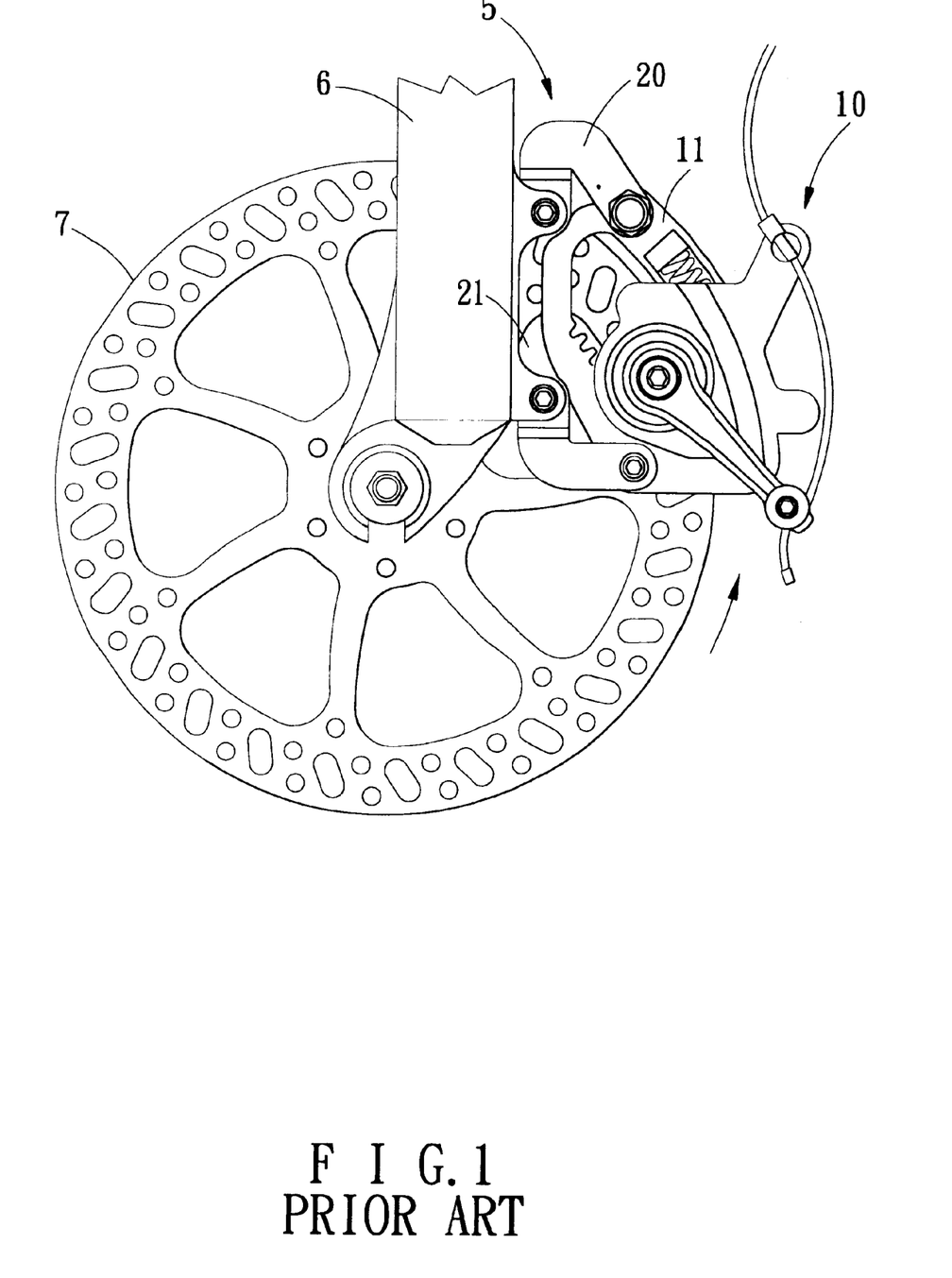
FIG. 1 is a side view to show the disk brake system of the present invention.
Figure 2:
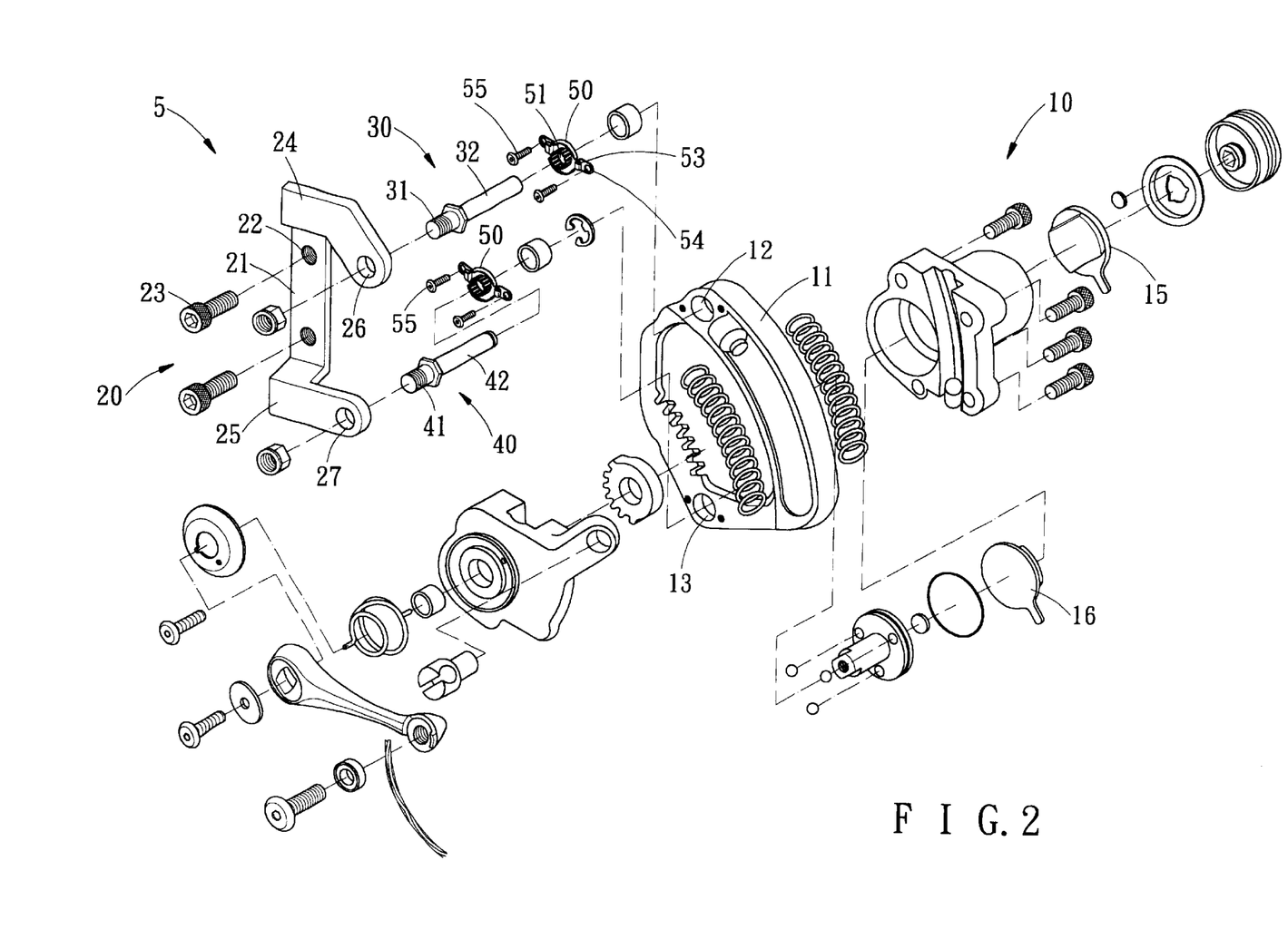
FIG. 2 is an exploded view to show the disk brake system of the present invention.
Figure 3:
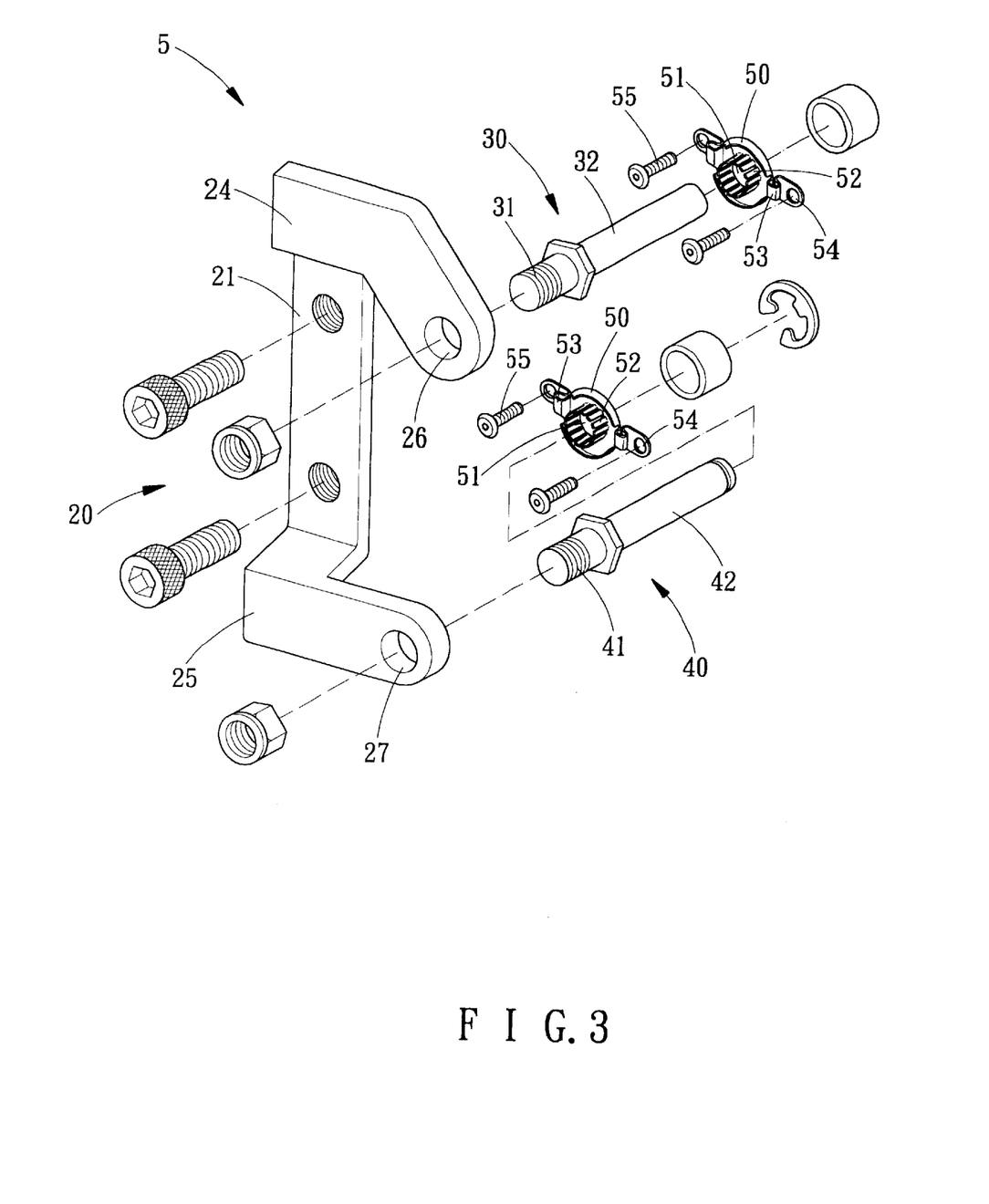
FIG. 3 is an exploded view to show the arm, the two rods and the two mounting pieces of the disk brake system of the present invention.

Referring to FIGS. 1 to 3, the disk brake system 10 of the present invention comprises two linings 15, 16 which are located on two sides of a brake disk 7 and an arm 20 includes a main section 21 and a top portion 24 and a lower portion 25 are respectively connected to two ends of the main section 21. Two threaded holes 22 are defined through the main section 21 so that bolts 23 threadedly extend through the threaded holes 22 and connected to the bicycle frame such as the front fork 6. The top portion 24 and the lower portion 25 each have a through holes 26/27.

A first adjusting rod 30 has a first threading end 31 which extends through the through hole 26 of the top portion 24 and is positioned by a nut so as to be fixed to the top portion 24. A first shank 32 is connected to the first threading end 31 and extending through a hole 12 in a frame 11. A second adjusting rod 40 has a second threading end 41 which extends through the through hole 27 of the lower portion 25 and is positioned by a nut so as to be fixed to the lower portion 25 A second shank 42 is connected to the second threading end 41 and extends through the other hole 13 in the frame 11.

A mounting device 5 includes two mounting pieces 50 made of flexible material and each mounting piece 50 has a hole 51. A clamp portion 52 is defined around the hole 51 of each of the two mounting pieces 50 and composed of a plurality of plates extending from a periphery of the hole 51. The first shank 32 and the second shank 42 respectively extend through the two respective holes 51 of the two mounting pieces 50 and are clamped by the clamp portions 52. Two spring portions 53 extend from the each mounting piece 50 and two extensions extend from the two spring portions 53. A fixing hole 54 is defined through each of the two extensions such that the mounting pieces 50 are fixed to the frame 11 by bolts 55 extending through the fixing holes 54 and fixed to the frame 11. The two spring portions 53 are bent outward relative to the hole 51.

Figure 4:
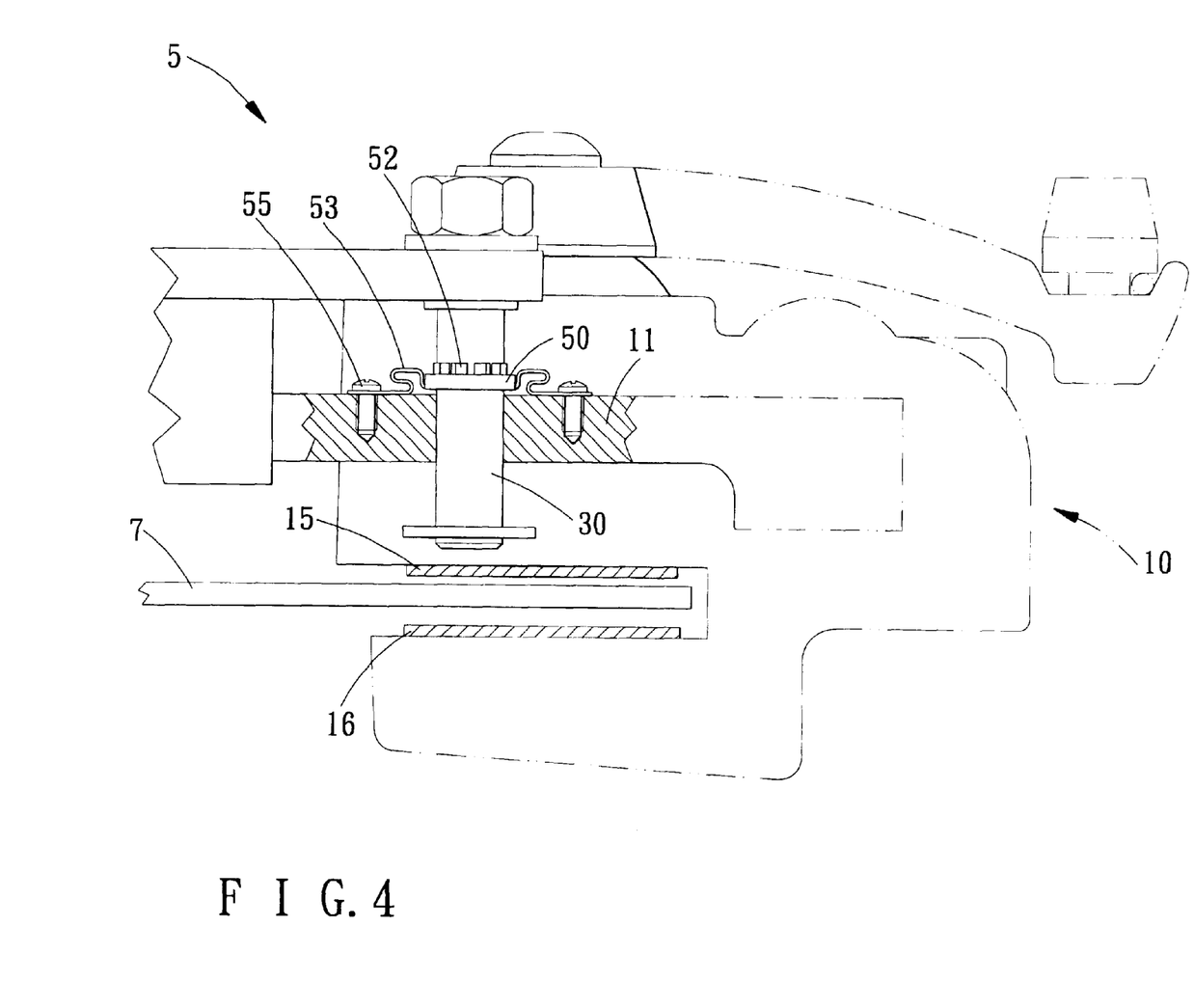
FIGS. 4 to 7 show the gaps of the two linings and the disk is not even and the relative position of the linings and the disk is adjusted from one side.
Figure 5:
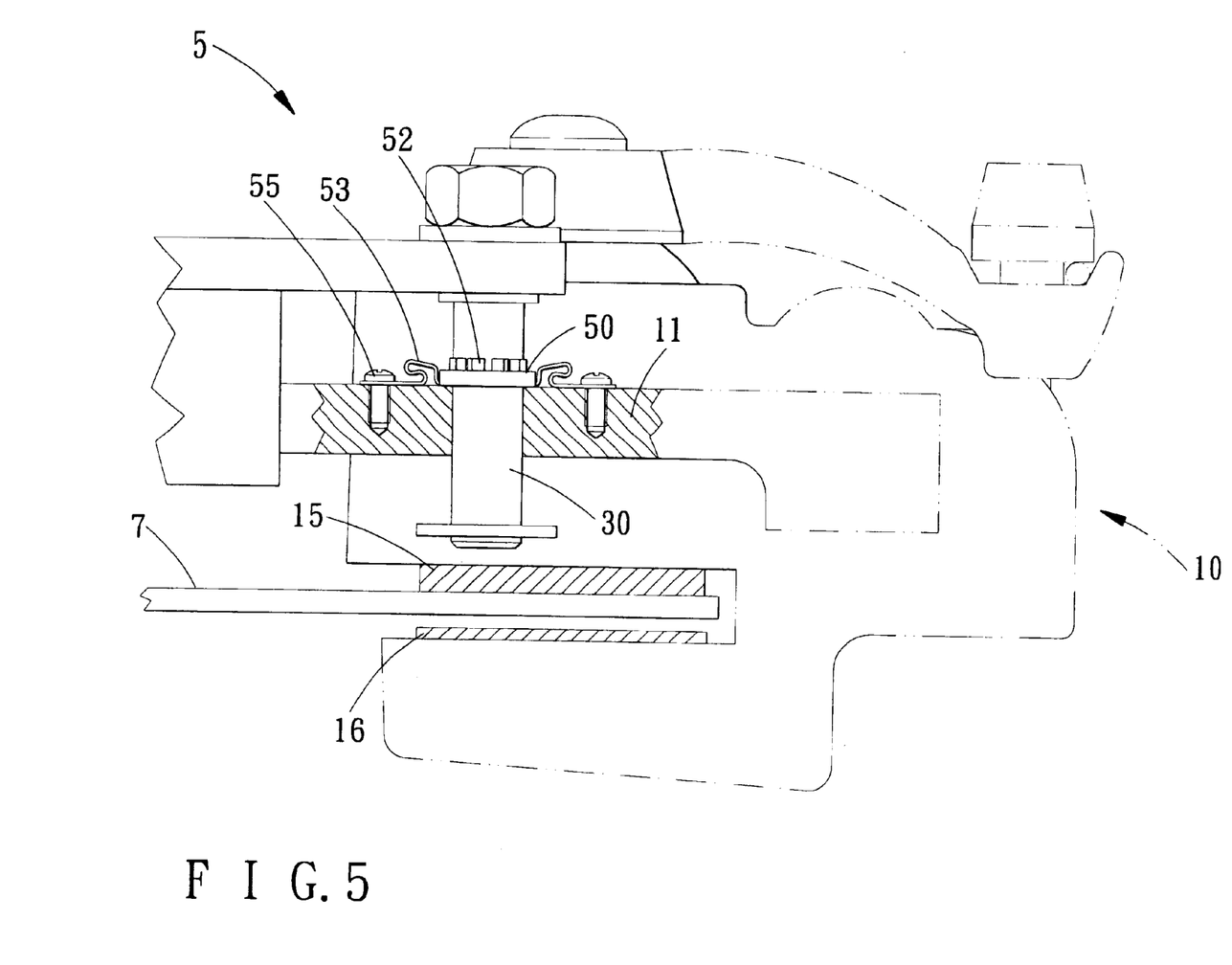
Figure 6:
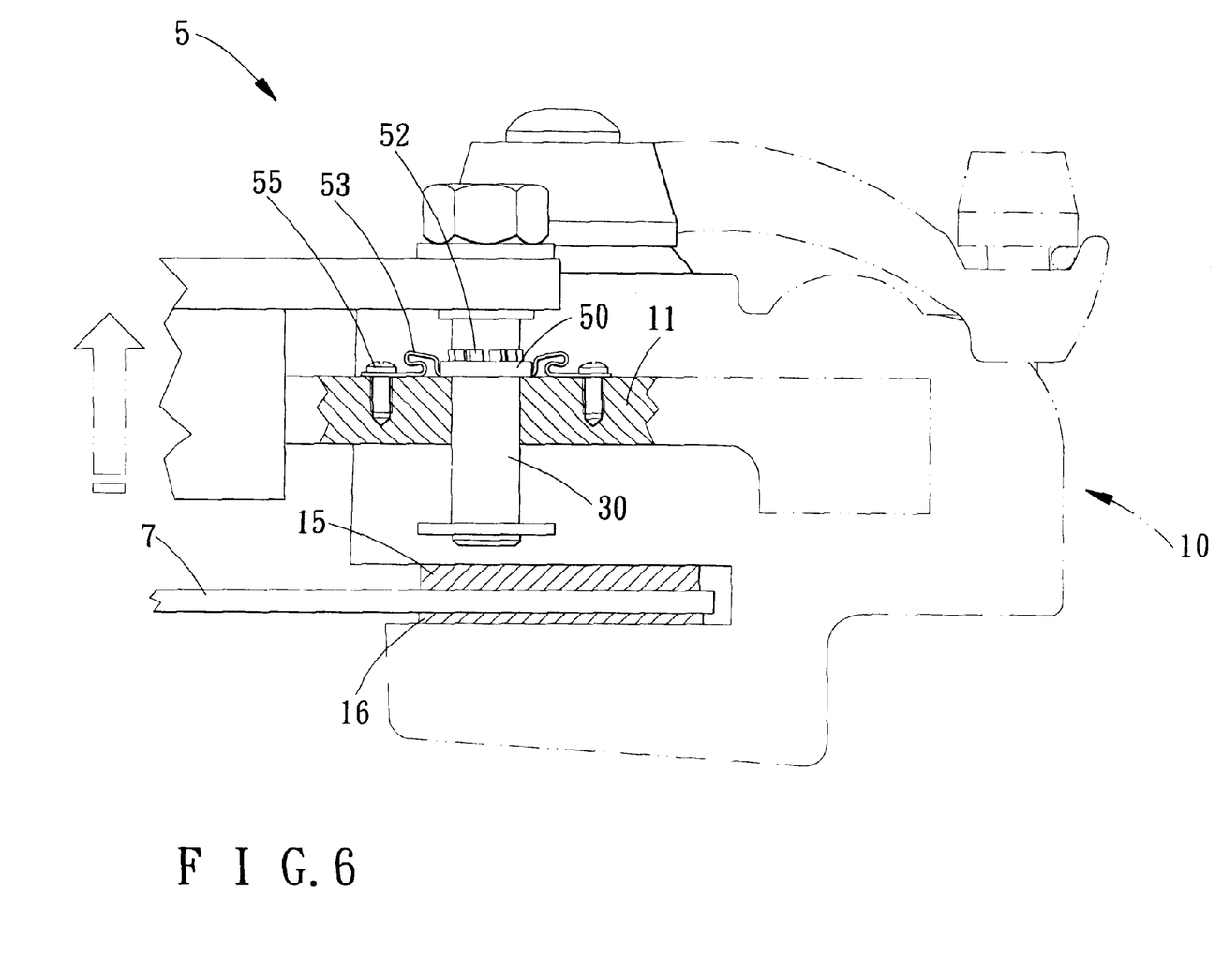

As shown in FIGS. 4 to 7, when the gaps between the linings 15, 16 and the disk 7 are uneven as shown in FIG. 4, the lining 15 will contact the disk 7 first. The frame 11 is shifted along the first adjusting rod 30 and the second adjusting rod 40. The spring portions 53 of the two rods 30 and 40 are deformed by the frame 11 to let the bottom of the mounting pieces 50 contact the frame 11 as shown in FIG. 5. This is because the forces of the clamp portions 52 and the spring portions 53 are less than the braking force and the force that the linings 15, 16 clamping the disk 7. The friction of the frame 11 is less than the forces of the clamp portions 52 and the spring portions 53.

The force of the spring portions 53 is less than the force of the clamp portions 52. Therefore, the frame 11 can be moved along the two rods 30 and 40 as shown in the arrow head in FIG. 6, so that the other lining 16 can contact the disk 7.

Figure 7:
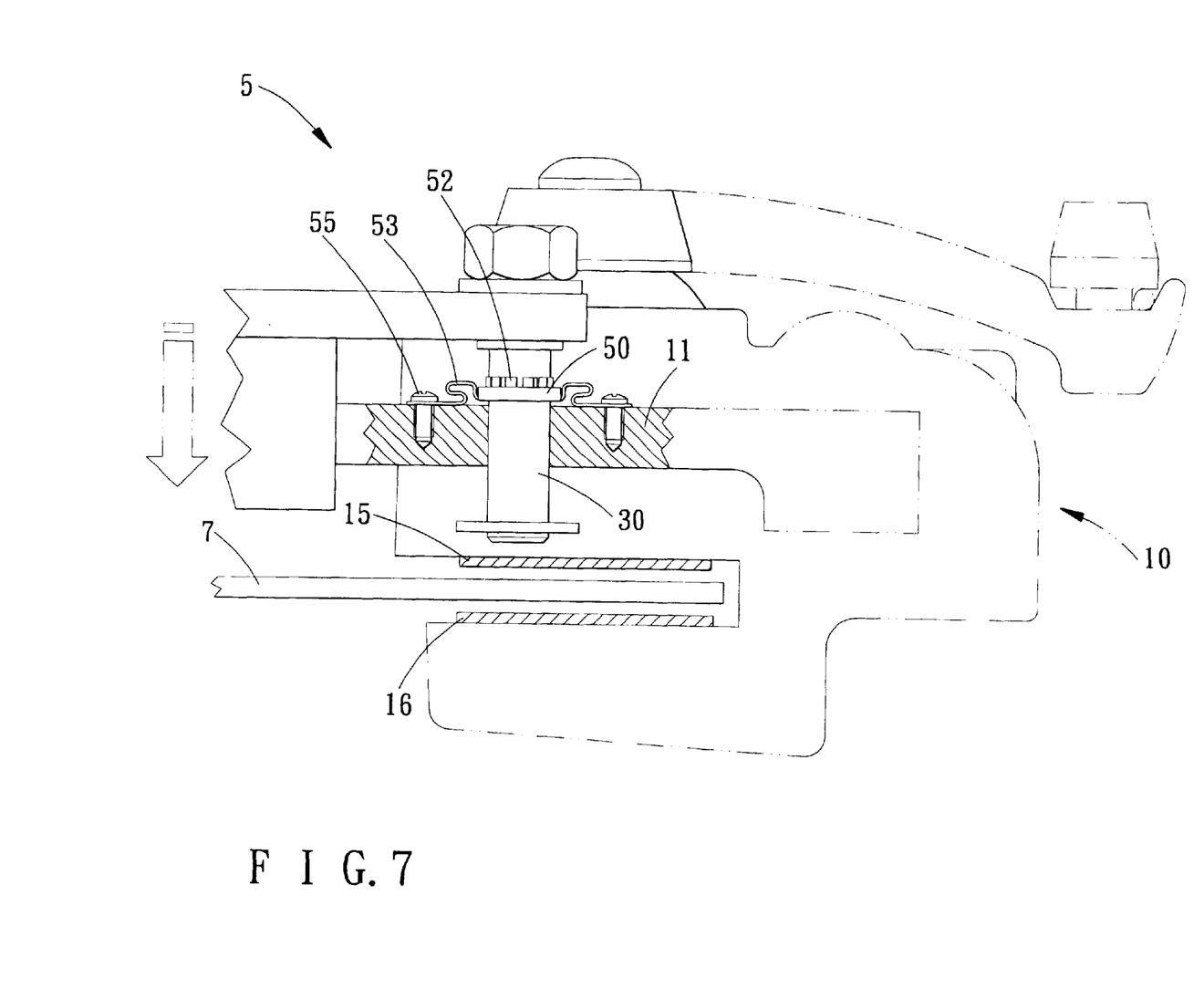

When the braking action is stopped, because the friction of the frame 11 is less than the forces of the clamp portions 52 and the spring portions 53, the force of the spring portions 53 will push the frame 11 as shown by the arrow head in FIG. 7 and the gap between the lining 16 and disk 7 can be adjusted. Therefore, the two linings 15, 16 and the disk 7 are located in parallel with each other and the gaps are the same.

Figure 8:
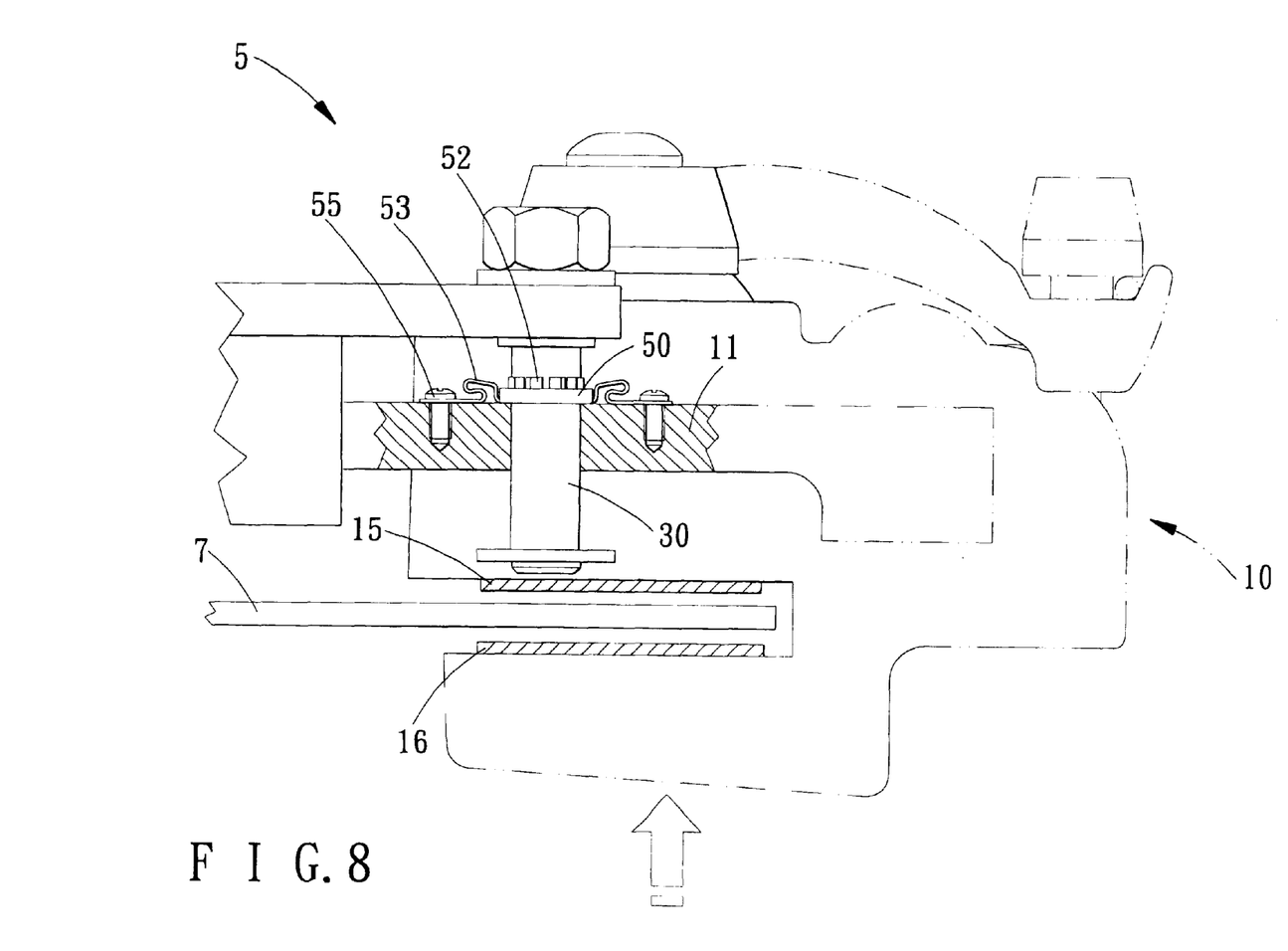
FIGS. 8 and 9 show the relative position of the linings and the disk is adjusted from the other side.
Figure 9:
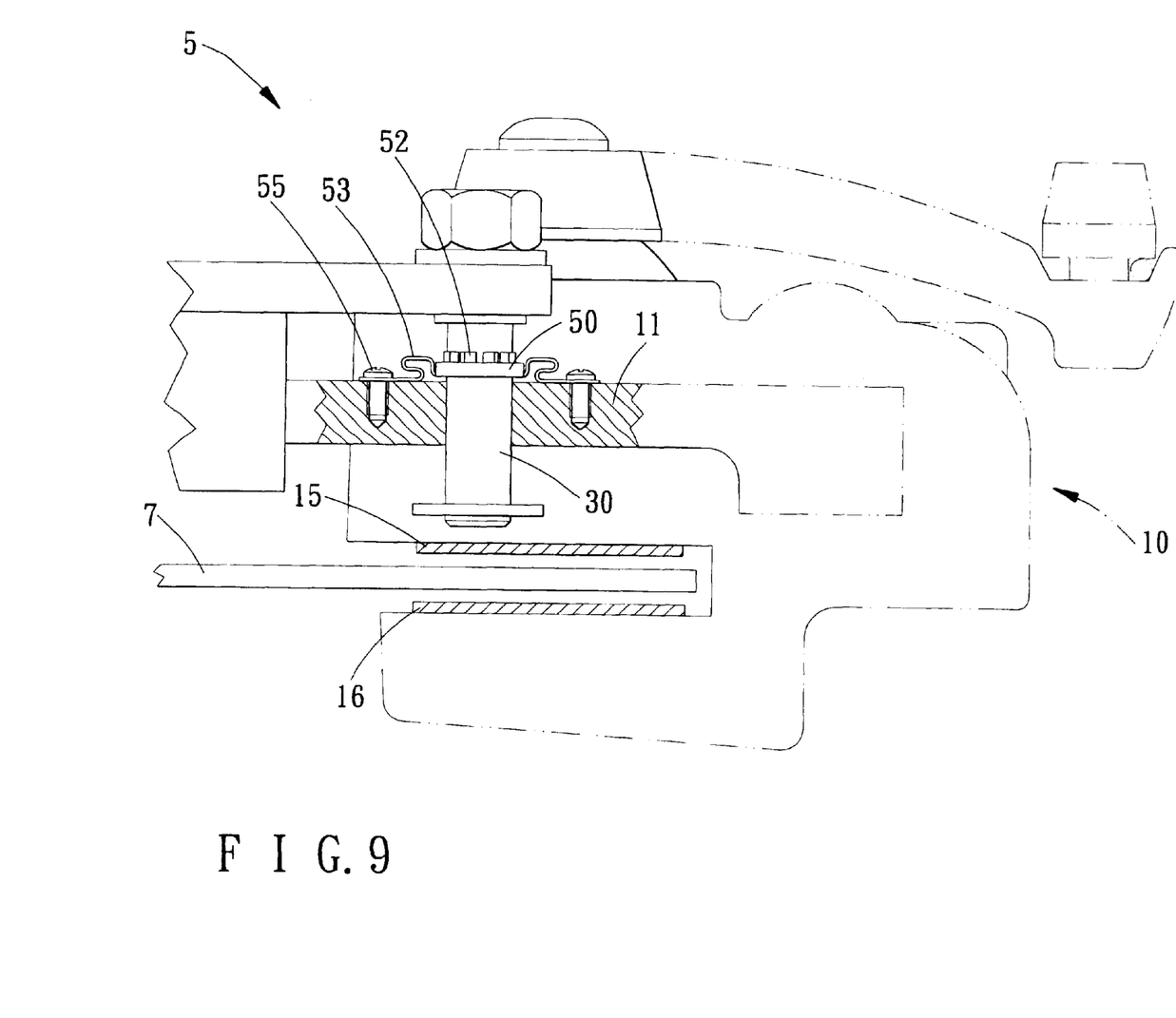

Referring to FIGS. 8 and 9, if the brake system 10 is applied by a force as shown by the arrow head in FIG. 8, the gaps will not be even as shown and the spring portions 53 of the two rods 30 and 40 are compressed, and the bottoms of the mounting pieces 50 contact the frame 11. When the force is disappeared, the force of the spring portions 53 pushes the frame 11 to an opposite direction of the force applied to the system and the two linings 15, 16 are moved to have the same gaps with the disk 7 as shown in FIG. 9.

Figure 10:
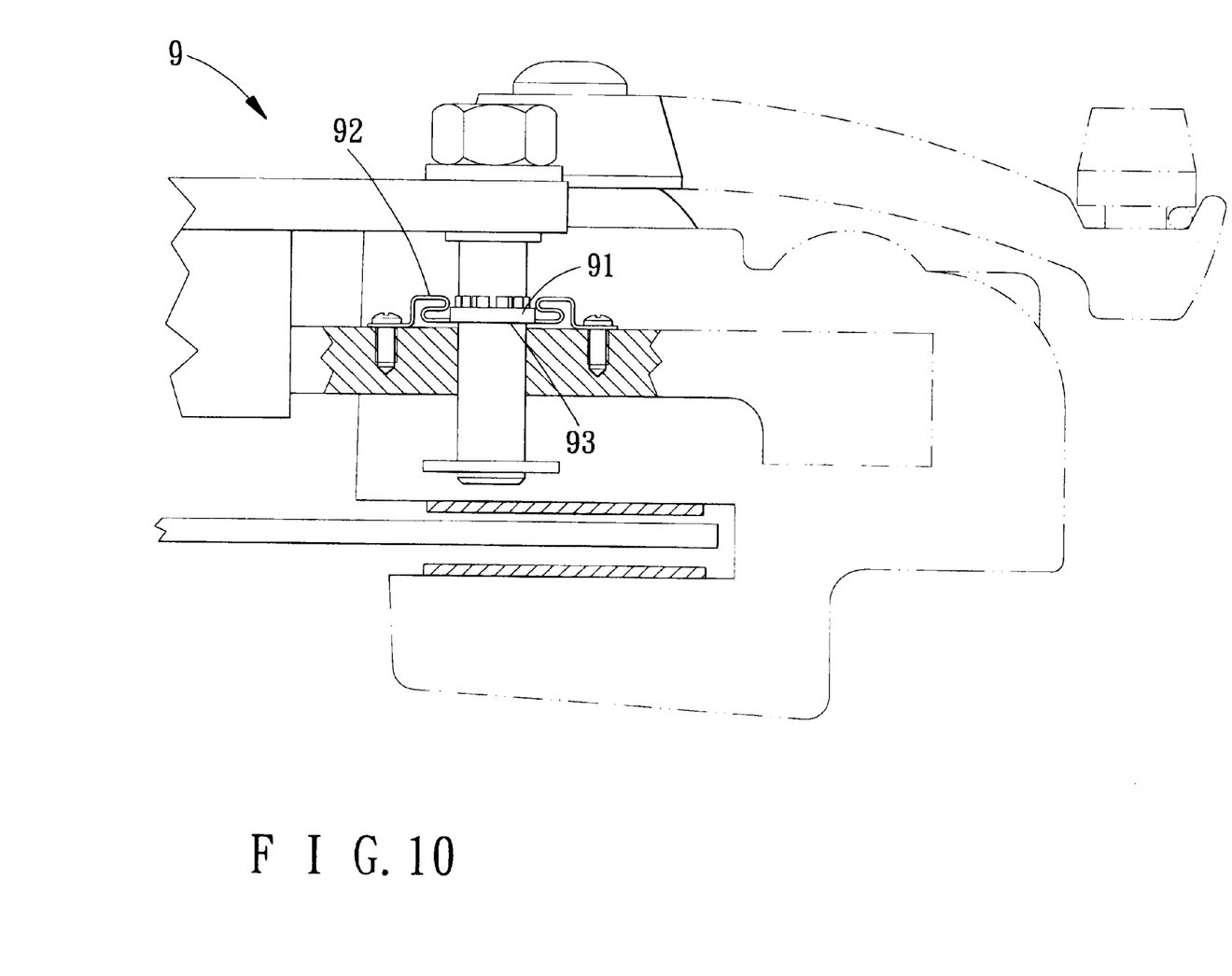
FIG. 10 shows another embodiment of the disk brake system of the present invention.

As shown in FIG. 10 which discloses another embodiment of the present invention, wherein the spring portions 92 of the two mounting pieces 91 of the mounting device 9 are bent inward relative to the hole 93.

It is to be noted that the way of connection between the mounting pieces and the frame can be made by way of welding, riveting or any known methods.

While we have shown and described the embodiment in accordance with the present invention, it should be clear to those skilled in the art that further embodiments may be made without departing from the scope of the present invention.

What is claimed is:

1. A disk brake system comprising:

two linings which are adapted to be located on two sides of a brake disk;

an arm adapted to be fixed to a bicycle frame and including a top portion and a lower portion;

a first adjusting rod having a first threading end which is fixed to the top portion, and a first shank extending from the first threading end and extending through a frame;

a second adjusting rod having a second threading end which is fixed to the lower portion, and a second shank extending from the second threading end and extending through the frame, and a mounting device including at least one mounting piece made of flexible material and having a hole, a clamp portion defined around the hole of the at least one mounting piece so that the first shank or the second shank extends through the hole and clamped by the clamp portion of the at least one mounting piece, two spring portions extending from the at least one mounting piece and two extensions extending from the two spring portions, a fixing hole defined through each of the two extensions such that the at least one mounting piece is fixed to the frame by bolts or rivets extending through the fixing holes, the frame being shifted by the spring portions and the clamp portion when braking.

2. The system as claimed in claim 1, wherein the mounting device includes two mounting pieces made of flexible material and each have a hole, a clamp portion defined around the hole of each mounting piece so that the first shank and the second shank extend through the two respective holes and clamped by the two respective clamp portions of the two mounting pieces, two spring portions extending from each of the two mounting pieces and two extensions extending from the two spring portions of each of the two mounting pieces, a fixing hole defined through each of the extensions such that the two mounting pieces are fixed to the frame by bolts extending through the fixing holes.

3. The system as claimed in claim 2, wherein frame has two holes and the first shank and the second shank extend through the two holes.

4. The system as claimed in claim 1, wherein the arm includes a main section through which threaded holes are defined bolts threadedly extend through the threaded holes and adapted to be connected to the bicycle frame, the top portion and the lower portion respectively having a through holes so that the first threading end and the second threading end extend through the through holes.

5. The system as claimed in claim 2, wherein the clamp portion of each of the two mounting pieces comprises a plurality of plates extending from a periphery of the hole.

6. The system as claimed in claim 1, wherein the two spring portions bend inward relative to the hole.

7. The system as claimed in claim 1, wherein the two spring portions are bent outward relative to the hole.

8. The system as claimed in claim 1, wherein at least one mounting piece are welded to the brake system.

* * * * *